United States Patent [19]
Khan et al.

[11] Patent Number: 5,948,087
[45] Date of Patent: Sep. 7, 1999

[54] COMPUTER ARCHITECTURE HAVING PLATFORM-DEPENDENT AND PLATFORM-INDEPENDENT BOARDS FORMING THE MOTHERBOARD

[75] Inventors: Liaqat Y. Khan, San Ramon; Alanghat G. Karunakaran, Saratoga, both of Calif.

[73] Assignee: Nexar Technologies, Inc., Westborough, Mass.

[21] Appl. No.: 08/766,039

[22] Filed: Dec. 16, 1996

[51] Int. Cl.⁶ .................................................. G06F 13/00
[52] U.S. Cl. ............................................................ 710/102
[58] Field of Search .................................. 395/282, 281, 395/309; 361/600

[56] References Cited

U.S. PATENT DOCUMENTS

| | | | |
|---|---|---|---|
| 4,301,494 | 11/1981 | Jordan | 361/798 |
| 4,628,413 | 12/1986 | Speraw | 361/798 |
| 4,702,535 | 10/1987 | Beun | 312/308 |
| 4,754,397 | 6/1988 | Varaiya et al. | 361/685 |
| 4,942,550 | 7/1990 | Murray | 395/282 |
| 5,218,514 | 6/1993 | Huynh et al. | 361/683 |
| 5,367,571 | 11/1994 | Bowen et al. | 380/20 |
| 5,398,161 | 3/1995 | Roy | 361/727 |
| 5,460,441 | 10/1995 | Hastings et al. | 312/298 |
| 5,479,618 | 12/1995 | Van de Steeg et al. | 364/167.01 |
| 5,495,390 | 2/1996 | Yu | 361/683 |
| 5,515,514 | 5/1996 | Dhuey et al. | 395/282 |
| 5,530,887 | 6/1996 | Harper et al. | 395/284 |
| 5,539,616 | 7/1996 | Kikinis | 361/686 |
| 5,546,273 | 8/1996 | Harris | 361/697 |
| 5,549,375 | 8/1996 | Pagliaccio | 312/319.1 |
| 5,604,871 | 2/1997 | Pecone | 395/281 |
| 5,673,174 | 9/1997 | Hamirani | 361/686 |
| 5,691,880 | 11/1997 | Seto et al. | 361/681 |
| 5,708,563 | 1/1998 | Cranston, III et al. | 361/683 |

Primary Examiner—Gopal C. Ray
Attorney, Agent, or Firm—McDermott, Will & Emery

[57] ABSTRACT

A computer system includes a "motherboard" comprising two separate boards: an input/output (I/O) board and a logic board. The I/O board, which includes functionality for interfacing and controlling the computers input/output functions, is substantially platform-independent. It is secured into the housing in the manner of a conventional motherboard. The logic board, which includes a processor, processor controller and/or processor memory, is platform-specific. It is slidably (or otherwise easily) removable from the housing, e.g., without disassembly thereof.

23 Claims, 6 Drawing Sheets

| REF. | ROW C | ROW B | ROW A |
|---|---|---|---|
| 1 | SA17 | SA15 | SA16 |
| 2 | SA13 | SA18 | SA14 |
| 3 | LA20 | SA12 | SA19 |
| 4 | SBHE# | GND | SA11 |
| 5 | SA10 | LA21 | LA22 |
| 6 | SA9 | SA8 | LA23 |
| 7 | IRQ7 | BALE | TC |
| 8 | DREQ3 | IRQ8 | IRQ5 |
| 9 | DREQ1 | ATCLK | GND |
| 10 | PWRRST# | GND | IOW# |
| 11 | SMEMW# | DACK1# | DACK3# |
| 12 | SMEMR# | IOR# | SD0 |
| 13 | BOWS# | BAEN | SD1 |
| 14 | DREQ2 | SD3 | SD2 |
| 15 | SD5 | IRQ9 | SD4 |
| 16 | IOCHK# | SD7 | SD6 |
| 17 | SA7 | GND | IRQ3 |
| 18 | DACK2# | IRQ4 | SA5 |
| 19 | SA4 | SA6 | SA2 |
| 20 | SA3 | SA1 | MCS16# |
| 21 | SA0 | IOCS16# | IRQ11 |
| 22 | IRQ10 | IRQ12 | IRQ14 |
| 23 | IRQ15 | DACK0# | MEMR# |
| 24 | DREQ0 | DACK5# | DREQ5 |
| 25 | MEMW# | SD8 | SD9 |
| 26 | DACK6# | DREQ6 | DACK7# |
| 27 | SD10 | SD11 | SD12 |
| 28 | DREQ7 | SD13 | SD15 |
| 29 | SD14 | REF# | GND |
| 30 | MASTER# | OSCISA | IORDY# |
| 31 | USB1+ | GND | USB0+ |
| 32 | USB0- | NC | USB- |

Fig. 6B

| REF. | ROW C | ROW B | ROW A |
|---|---|---|---|
| 1 | IRQ1 | PIRQA# | PIRQC# |
| 2 | IRQ8# | PIRQB# | PIRQD# |
| 3 | PCIREQ0# | GND | PCIGNT0# |
| 4 | AD0 | AD1 | AD2 |
| 5 | AD3 | GND | AD4 |
| 6 | AD5 | AD6 | AD7 |
| 7 | GND | CBE#0 | GND |
| 8 | AD8 | AD9 | AD10 |
| 9 | AD11 | GND | AD12 |
| 10 | AD13 | AD14 | AD15 |
| 11 | GND | CBE#1 | GND |
| 12 | PCILOCK# | PAR | STOP# |
| 13 | GND | DEVSEL# | GND |
| 14 | TRDY# | GND | IRDY# |
| 15 | GND | FRAME# | GND |
| 16 | AD16 | GND | CBE#2 |
| 17 | AD17 | AD18 | GND |
| 18 | AD19 | GND | AD20 |
| 19 | AD21 | AD22 | AD23 |
| 20 | GND | CBE#3 | GND |
| 21 | AD26 | AD25 | AD24 |
| 22 | AD28 | GND | AD27 |
| 23 | AD31 | AD30 | AD29 |
| 24 | NC | NC | NC |
| 25 | PCIGNT2# | PCIREQ1# | PCIGNT1# |
| 26 | PCIREQ3# | PCIGNT3# | PCIREQ2# |
| 27 | SERR# | GND | PERR# |
| 28 | GND | PCICLK2 | NC |
| 29 | GND | PCICLK1 | NC |
| 30 | GND | PCICLK0 | GND |
| 31 | GND | PCICLK3 | NC |
| 32 | KBDRST# | A20M# | PCIRST# |

COMPUTER ARCHITECTURE HAVING PLATFORM-DEPENDENT AND PLATFORM-INDEPENDENT BOARDS FORMING THE MOTHERBOARD

This application is related to corresponding U.S. application Ser. No. 08/937,588 filed Apr. 6, 1998, titled "Means and Method for External Access and Replacement of Motherboard Components".

FIELD OF THE INVENTION

This invention relates to architectures for personal computers (PC's), workstations, file servers, and the like, and more particularly, to motherboard architectures for such computers that facilitate both easy upgrading of the computers and improved heat management.

BACKGROUND OF THE INVENTION

In recent years, PC's and other computers have experienced significant rapid advances in processor speed and performance, in available memory, and in system architecture that frequently result in the computers being rendered obsolete within months of being announced and, sometimes, shortly after the products hit dealers shelves. This creates problems for customers, particularly major corporate and other institutional customers who want or need to keep their systems at or near state-of-the-art performance levels without incurring significant upgrade expenses every few years. It creates even greater problems for manufacturers and dealers whose inventory can quickly become obsolete, resulting in returns or significant markdowns on recently delivered computers and computer systems.

One solution to this problem is to ship computers and computer systems to dealers without the portions of such systems, such as processors and memory, which are most likely to require upgrading, and to permit the dealers to install the most current versions of such components at or near the time of sale. However, PC's, workstations and other such computers have heretofore required substantial disassembly in order to provide access to their central circuit boards, i.e., the "motherboards," containing critical components such as processor chips and memory boards. As these tasks typically must be performed by trained service personnel, the time and expense of installing these components at the retail level renders uneconomical shipping computers that are not fully complete and operational. Field upgrades by institutional users are also time-consuming and expensive and, accordingly, are seldom made. Further, though existing computer architectures permit a computer chip or memory board to be replaced, they do not provide sufficient flexibility to permit a retailer or end-user to move from one processor family to another, for example, from Pentium™, to ALPHA™, to Pentium Pro™, to Power PC™, etc. Rather, upgrades are limited to processors within a given family and, then, only with considerable effort.

Finally, as processors and memories are designed which provide increasing power, speed, and capacity in the same or smaller spaces, the heat generated by such components also increases, and heat removal becomes a limiting factor in the power and speed of a given computer. Thus, any computer architecture which permits power and speed upgrades must provide sufficient heat management to accommodate such upgrades.

In view of the foregoing, an object of the invention is to provide improved computer architectures and components thereof. More particularly, an object is to provide computer architectures and components that facilitate easy installation, replacement and upgrades both within and between processor families.

A still further object of the invention is to provide such architectures and components that facilitate such installation, replacement and upgrades within the same computer housing or chassis.

Yet still another object of the invention is to provide such architectures and components that provide improve heat management so as to accommodate operating requirements of newer and faster hardware.

Still yet another object of the invention is to provide such architecture and components for use with PC's, as well as workstations, file servers and other more powerful computers, some of which may include multiple processor chips on a single motherboard.

A further object of the invention is to provide such architecture and components that are compatible with existing architectures and that can be implemented with minimal cost.

SUMMARY OF THE INVENTION

The foregoing are among the objects met by the invention, which provides in one aspect a computer assembly that includes two separate boards, a logic board and an input/output (I/O) board, that together serve the function of a conventional, single-board motherboard. The I/O board substantially contains platform-independent elements. It is secured into the housing in the manner of a conventional motherboard. The logic board contains platform-specific elements. It is easily removable from the housing, e.g., via sliding it out a panel in the front of the housing.

Thus, in one aspect, the invention provides a motherboard set for a computer. The set includes a logic board that is adapted for performing at least processor, processor control and processor memory functions of the computer. The set also includes an I/O board that is adapted for performing at least interface and control functions with selected inputs and outputs of the computer. Connector components are provided on each of the logic board and said I/O board that permit those boards to mate and, when so mated, permit selected address, data, and control signals to pass between them.

In a related aspect, the invention provides a motherboard set as described above in which the logic board is adapted to be at least one of slidably installed and slidably removed from a housing of the computer. Conversely, the I/O board can be adapted to be fixedly secured within the housing of the computer.

The logic board of a motherboard set as described above can be adapted to perform the processor, processor control and processor memory functions associated with a selected processor family (e.g., Pentium™, ALPHA™, Pentium Pro™, Power PC™). Conversely, the I/O board can be adapted to perform input/output interface and control functions regardless of the processor family with which the logic board is associated. Accordingly, a single I/O board can be coupled with different logic boards in order to configure the computer for different platforms.

According to further aspects of the invention, a motherboard set as described above can include a logic board and an I/O board that face in opposite directions. For example, the component side of the I/O board can face away from the nearest side of the computer housing, while the component side of the logic board faces toward that side.

A logic board as described above can, further, include sockets for one or more processors and sockets for memory boards. The logic board can further include connector components that are unkeyed or are keyed to permit connection of the boards facing in opposite directions. Separate power connections can be provided on each of the boards.

According to a further aspect of the invention, the logic board and I/O board can be coupled via multi-pin connectors, at least selected pins of which are grounded to maintain signal integrity for selected signals passing between the boards.

The invention provides, in still further aspects, a logic board as described above, which logic board can be coupled with an I/O board as described above to serve as a computer motherboard.

In still other aspects, the invention provides a computer assembly including a motherboard set as described above and further including mountings for the logic board and the I/O board. The mounting for the logic board is adapted to permit easy insertion of the logic board into the housing, easy removal of said logic board from the housing, and easy mating of connector components on the logic and I/O boards when the logic board is inserted into the housing. The mounting for the I/O board is adapted for fixedly securing the I/O board in the housing.

Yet other aspects of the invention provide a computer assembly as described above in which the boards of the motherboard set define two chambers in the computer housing: a first chamber between the boards on one side and a far wall of the housing on the other side; and a second larger chamber between the boards on one side and a near wall of said housing on the other side. According to this aspect of the invention, a separate heat removal mechanism, e.g., a fan, is provided for each of the chambers.

Yet still other aspects of the invention provide a method for assembling a computer paralleling the operations described above.

These and other aspects of the invention are evident in the drawings and in the description that follows.

BRIEF DESCRIPTION OF THE DRAWINGS

A more complete understanding of the invention may be attained by reference to the drawings, in which:

FIGS. 4A, 4A-1, 4B, 4B-1 are enlarged exploded perspective view of a two-part motherboard set shown in FIG. 1.

DETAILED DESCRIPTION OF THE ILLUSTRATED EMBODIMENT

Figure 1:
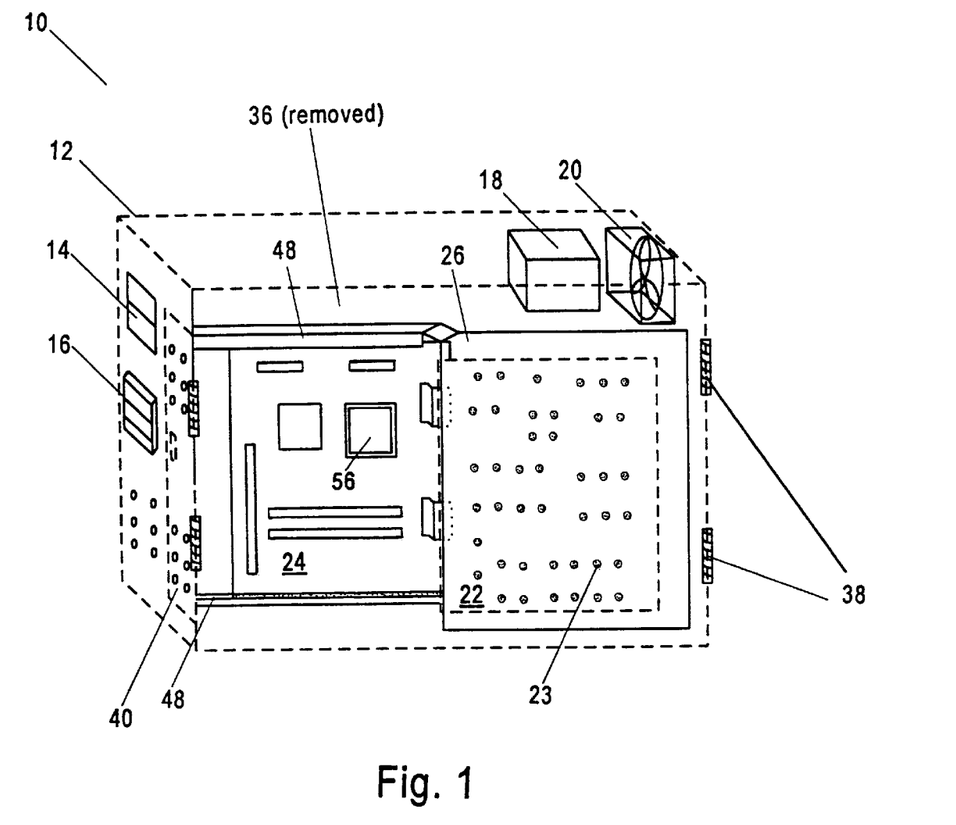
FIG. 1 is a perspective view of a cross-platform computer assembly according to the invention.

Referring to the FIG. 1, computer 10 has a cabinet or housing 12 which may be of standard size. Housing 12 may for example be a desktop or tower housing for a personal computer (PC), or may house a workstation, file server or other computer device. Housing 12 may have one or more disk drives 14 (e.g., 5¼ inch disk drives, 3½ inch disk drives, CD ROM drives), as well as removable hard disk drives 16 mounted in the front thereof. The number and type of disk drives and their size will vary with application. Housing 12 also has a power supply 18 mounted therein, and a fan 20 is provided to cool the inside of housing 12 in general, and power supply 18 in particular. The power supply and fan are of the type commercially available in the art, the power supply being adapted to supply power to each of the logic board and the input/output board, as discussed below.

Two-Board Motherboard Set

Further, and in accordance with the teachings of this invention, the motherboard for the computer 10, which for prior art personal computers is a single board, is divided into two boards that will be referred to as an input/output (I/O) board 22 and a logic board 24. One of those boards, I/O board 22, contains inter alia platform-independent elements. It is secured into the housing in the manner of a conventional motherboard. The other board, logic board 24, contains inter alia platform-specific elements. It is slidably (or otherwise easily) removable from the housing. Though the boards 22, 24, together, provide the functionality of a conventional motherboard, they do not serve in that capacity individually.

I/O board 22 faces into housing 12 and is secured (e.g., via screws or fast-lock pins) to a frame member 26 which is rigidly attached to housing 12. The I/O board 22 faces in the same direction as the single-board motherboard of a prior art personal computer, i.e., away from the side 36 of the computer 10 which it (board 22) is nearest. The "solder" side of the board 22, i.e., the side of the board on which components are soldered, faces the near side 36 of computer. This is indicated in FIG. 1 by exemplary solder bond 23. For convenience of illustration, side 36 is not shown in the drawing.

I/O board 22 contains platform-independent functions, to wit, circuitry and components for interfacing and controlling various I/O devices and buses associated with the computer. Such devices may include, but are by no means limited to, a mouse, keyboard, disk drives (e.g., hard drives, or floppy drives), video monitor, printer and various audio components such as microphone and speakers. Buses can include various standard buses for interfacing to a computer including, but again by no means limited to, ISA, EISA, VL, PCI and/or universal serial buses. For a preferred embodiment, the board 22 provides interfaces to ISA, PCI and universal serial buses.

In a preferred embodiment, the I/O board 22 also has provision for SCSI controller chip and disk interface for SCSI devices. The I/O board also has support for RAID port connector. Those skilled in the art will appreciate that SCSI support chip and RAID support is an option and the board may be manufactured with or without this controller chip.

Figure 4A:
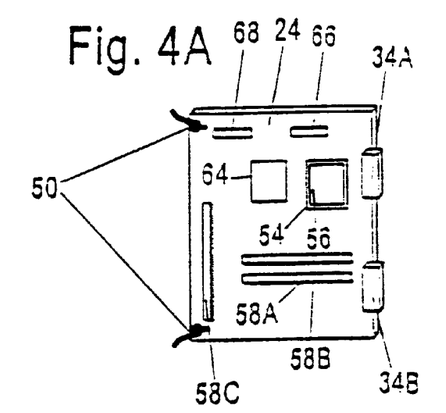
Figure 4A:
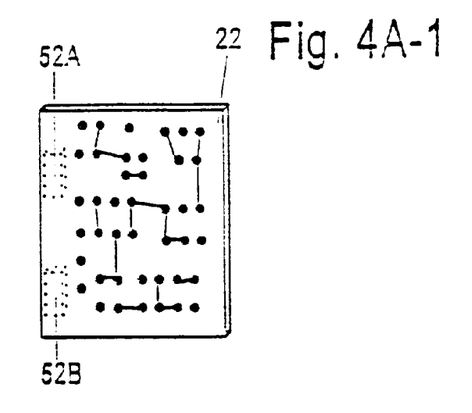
Figure 4B:
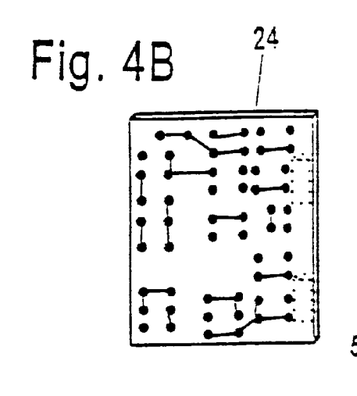

FIGS. 4A, 4A-1, 4B, 4B-1 depict the "component" sides of the logic board 24 and I/O board 22. FIGS. 4A, 4A-1, 4B, 4B-1 also depict the relationship between the component side of each board and solder side of the other board shown respectively in FIGS. 4A-1 and 4B, to wit, that the boards face in opposing directions. Particularly, in FIGS. 4A and 4A-1 there is shown the component side of logic board 24 side-by-side with solder side of I/O board 22 shown in FIG. 4A-1. Likewise, in FIGS. 4B and 4B-1 there is shown the solder side of logic board 24 side-by-side with the component side of I/O board 24 shown in FIG. 4B-1. As discussed herein, in one embodiment of the invention, the logic board 24 and I/O board 22 mate (via connectors 34, 52) such that the boards face in opposite directions, i.e., such that their component sides face away from each other (and, conversely, that their solder sides face away from each other), as shown in FIG. 1.

Figure 4B:
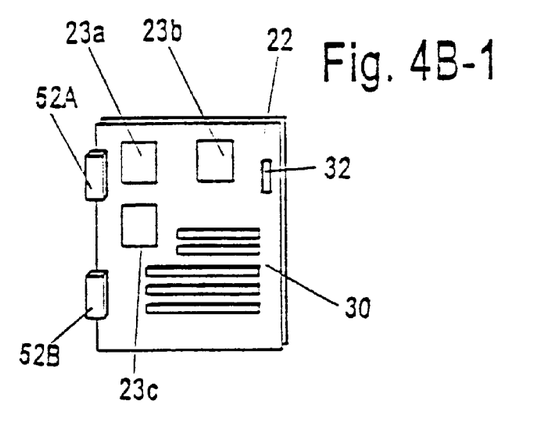

Referring to FIG. 4B-1, board 22 may contain various I/O controller chips and chip sets 23a, 23b, 23c, of the type used in a conventional PC motherboard and commercially available in the marketplace. Board 22 also includes conventional plugs and/or sockets 30 for connection to I/O devices via ports, e.g, serial ports, parallel ports, game ports, etc. (not shown), and via adapter cards, e.g., video cards, game cards, scanner cards, ethernet cards, etc. (not shown). Board 22 further includes connector 32 that mates with a corresponding connector from power supply 18 to provide power to board 22 and to the various components thereon. Finally, board 22 has a pair of connectors 52A, 52B which are adapted to interface I/O board 22 with logic board 24.

Referring to FIG. 1, logic board 24 faces out of housing 12 and slides into and out of the housing 12 on rails 48. The logic board 24 faces in the opposite direction as the single-board motherboard of a prior art personal computer, i.e., toward from the side 36 of the computer 10 which it (board 24) is nearest. This is indicated in FIG. 1 by exemplary central processing unit chip 56.

As shown in FIG. 4A-1, logic board 24 also has one or more sockets 54 into which a central processing unit chip 56, for example, a Pentium™, Pentium Pro™, Alpha™, etc., chip, may be mounted. It also has a number of sockets 58A–58C in which various memory boards may be mounted including, for suitable applications, a cache memory board. Sockets 54 and sockets 58 are preferably industry-standard low insertion force (LIF) or zero insertion force (ZIF) sockets so as to facilitate easy removal and replacement of processor and/or memory components as desired to permit upgrades of the computer within a given architecture or family.

Logic board 24 also has various circuitry and wiring thereon including, but not limited to a controller chip set 64, appropriate for the computer family of logic board 24. Chip set 64 may also include bus bridge circuitry, and it is presently preferred that such circuitry appear on the logic board since it affords greater flexibility in adapting to new or S different computer families; however, in some applications, it may be preferable for the bus bridge circuitry to reside on the I/O board 22. Jumpers, dip switches, and the like (not shown) are provided on logic board 24 to initialize and/or condition it for use with a particular central processing unit and/or memory combination in a processor family.

Further, board 24 has a power input connector/socket 66 and one or more sockets/connectors 68 for connection to disk drives or other suitable components. Connector 66 mates with an appropriate connector 70 (FIG. 2) from power supply 18 to apply power to board 24. Though power may be transferred to board 24 via connectors 34A, 34B, 52A, 52B, potential losses and distortion across those connectors could interfere with power transfer between the boards and, for timing, EMI considerations, signal integrity, and the like, it is therefore desirable, particularly for high speed operation, for each board to have its own individual power connection, e.g., 30 and 66.

By way of non-limiting example, in an embodiment of the invention that support the Intel Pentium™ architecture, logic board 24 particularly includes the following components (or component sockets) and/or functional groups: CPU(s), chip set (CPU, memory and bus controller), disk controller, power connector, voltage regulator module (VRM), memory module; while the I/O board 22 includes the following components (or component sockets) and/or functional groups: PCI slots, ISA slots, super I/O controller (keyboard, mouse, serial, parallel, floppy controller and real-time clock), and SCSI (disk) controller. This particular partitioning of functionality between the boards 22, 24 is suggested by way of example; those skilled in the art will appreciate that other partitionings may also be selected.

Figure 6A:
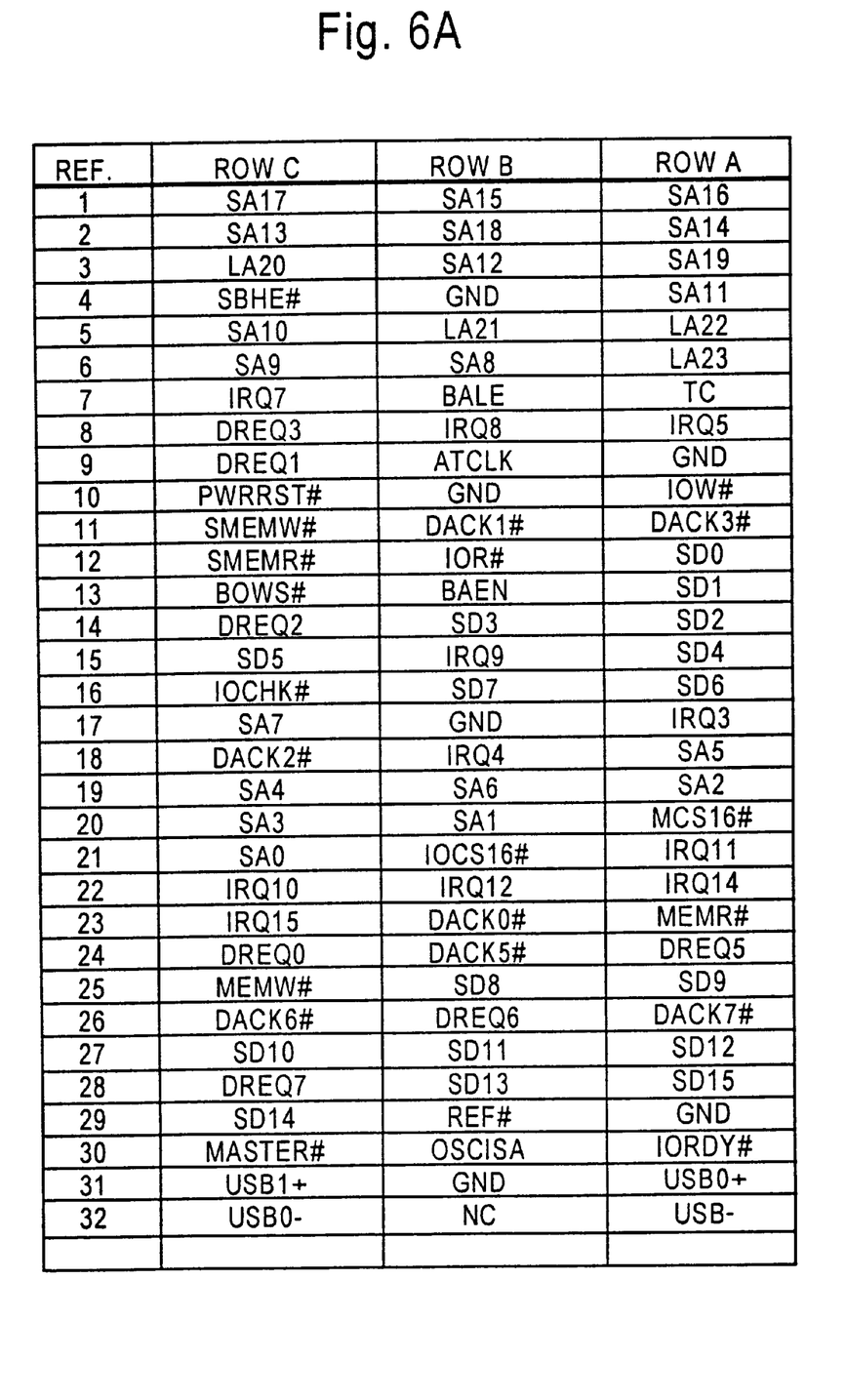
FIGS. 6A–6B are charts illustrating the pin assignment protocol for a preferred embodiment of the invention.
Figure 6B:
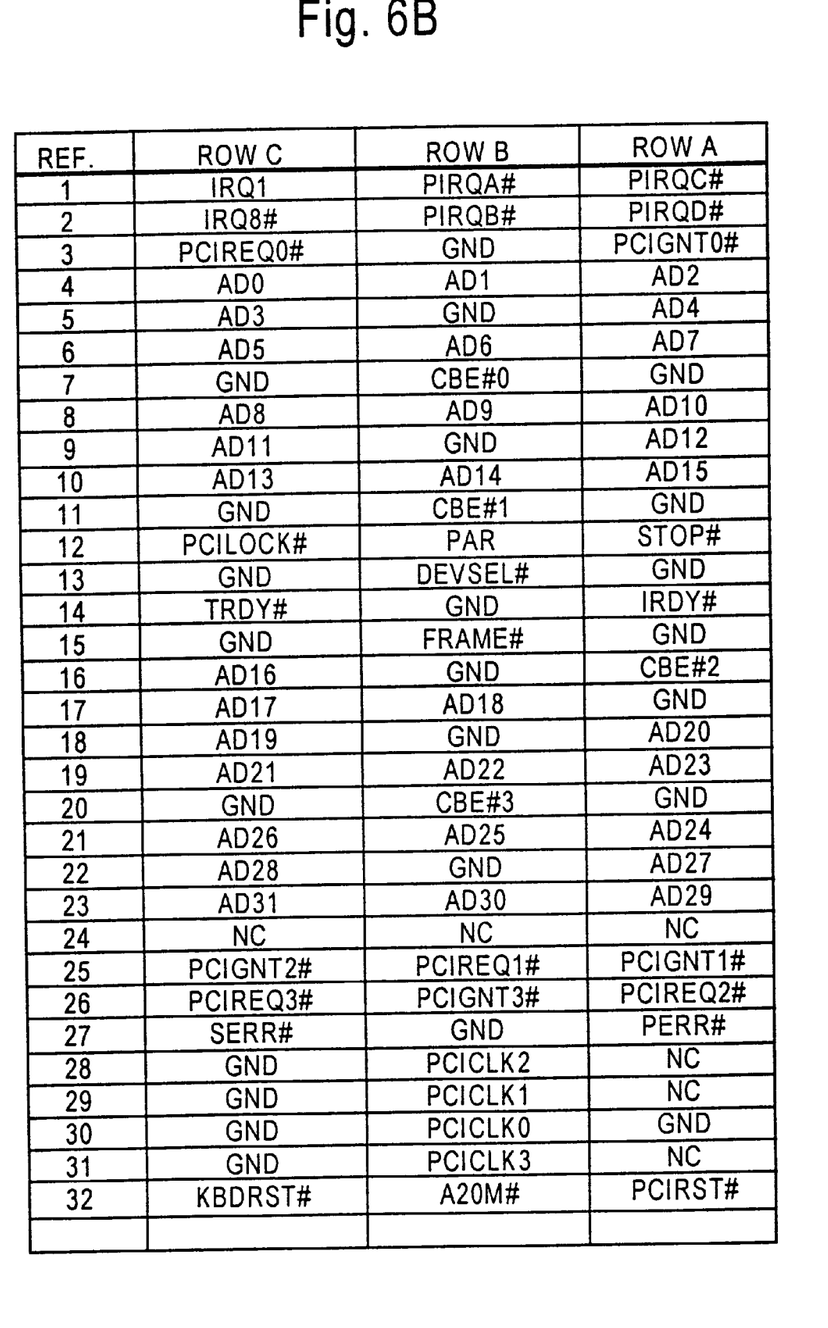

FIGS. 6A–6B show the pin protocol for the connectors 34, 54 that interconnect boards 22, 24. In the illustrated embodiment, each of these connectors has 96 pins with connectors 34A, 52A being designated as the "PCI" connector and connectors 34B, 54B being designated as the "ISA" connectors. Approximately sixty pins of the PCI connectors are used for transferring PCI signals between boards 22, 24, while approximately eighty pins of the ISA connectors are utilized for transferring ISA address, data and control signals between the boards 22, 24. Remaining pins on the PCI and ISA connectors are used for transferring clocking signals between the boards 22, 24, e.g., to control timing on PCI and ISA buses of connectors 30. The remaining pins are also used for transferring so-called "side band" signals, e.g., data and control signals for the USB (Universal Serial Bus), keyboard and mouse that are transferred exchanged directly from the logic board 24 to the corresponding connectors on the I/O board 22. Those side band signals also preferably include a RST (reset) signal for resetting logic on the boards 22, 24 (e.g., when the computer 10 is powered-up).

As further shown in FIGS. 6A–6B, various ones of the PCI and ISA connector pins are utilized as grounds in order to maintain the integrity and eliminate cross-talk between critical signals, particularly rapidly changing signals such as clocks. As noted above, since each board has its own separate power input, only ground, not power, is transferred though these two connectors.

Those skilled in the art will appreciate that the particular pin protocol shown in FIG. 5 is suggested by way of example. Other pin assignments may also be selected for transferring information between the logic board 24 and I/O board 22 may also be used.

The foregoing embodiment can be adapted to support, e.g., the Power PC™ architecture, without changing fixed I/O board 22 but, rather, merely by replacing logic board 24. A logic board suitable for use with the Power PC™ architecture, for example, can include components (or component sockets) and/or functional groups of the type listed above for the Pentium™ architecture. In addition, a Power PC™-compatible logic board 24 can include functionality that conditions signals generated by the Power PC™ central processing unit and memory boards for use with the I/O board 22.

Access to, and Slidable Replacement of, the Logic Board

The housing of 12 is particularly adapted to permit ready access to, and replacement of the logic board 24. Unlike prior art personal computers and workstations, that require disassembly and removal of components for motherboard access and replacement, logic board 24 can be accessed through panels in the front and/or side of the housing 12. This facilitates quick and easy installation and/or upgrading of the computer 10 to support differing processor architectures.

Figure 5A:
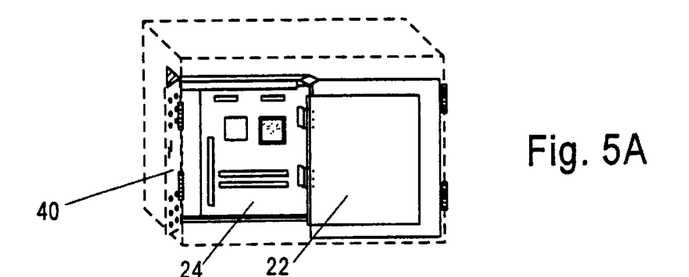
FIGS. 5A–5E are perspective views of the cross-platform computer assembly of FIG. 1 illustrating removal and insertion of the logic board portion of a two-part motherboard set according to the invention.
Figure 5B:
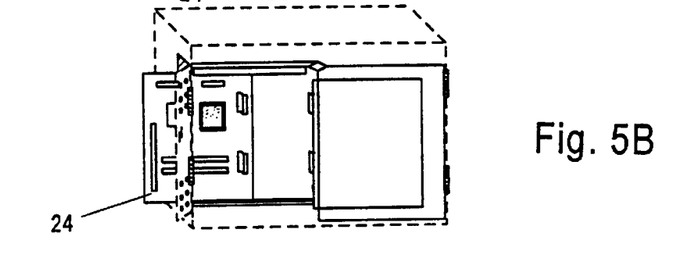
Figure 5C:
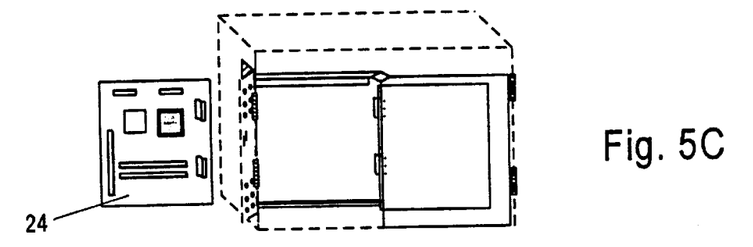

Referring to FIG. 1, hinged panel 40 is provided on the front of housing 12 to provide access to, and permit insertion and removal of, the logic board 24; see FIGS. 5A–5C. This also permits logic board 24 to be partially removed, e.g., to facilitate insertion and removal of components on the logic board 24, e.g., for upgrades within a processor family or architecture, without disassembly of the housing. It also permits the power cable 70 (FIG. 2) to be connected/ disconnected from slot 66 and jumpers, dip switches, and the like, on board 24.

Side 36 of housing 12 is optionally hinged, for example on a pair of hinges 38, and is adapted to be swung open on hinges 38 so as to expose inner right side of the housing and, more particularly, the components, connectors and cables for logic board 24. As with panel 40, this permits insertion and removal of components on the logic board 24, e.g., for upgrades within a processor family or architecture, without removal of board 24. It also permits the power cable 70 (FIG. 2) to be connected/disconnected from slot 66 and jumpers, dip switches, and the like, on board 24 to be set during insertion or removal of board 24 in the housing 12. While in FIG. 1, hinges 38 are shown at the rear of side 36 so that the entire side opens, hinges 38 can also be positioned midway along side 36 so as to still afford access to logic board 24.

The panels 36 and 40 may include handles (not shown) to facilitate opening. They may also include latch mechanisms (not shown) to secure them in their closed positions. The mechanisms may be for example magnetic latches or, for higher security, some type of key controlled latch may be provided to prevent unauthorized opening of the housing. Snap-fit or other suitable latch mechanisms may also be utilized. Suitable radio frequency (RF) seals are provided at all junctions between the portions of side 36 and portion 40 which opened and the remainder of the housing so as to prevent RF leakage at these junctions.

In an alternate embodiment (not shown), front panel 40 is integral with panel 36 and is not separately hinged. In this embodiment, as the unitary panel both openings in the front and side of the housing 12 are revealed, thereby, permitting the logic board 24 to be slidably installed or removed and permitting access to the components, connectors and cables on the logic board 24.

Figure 2:
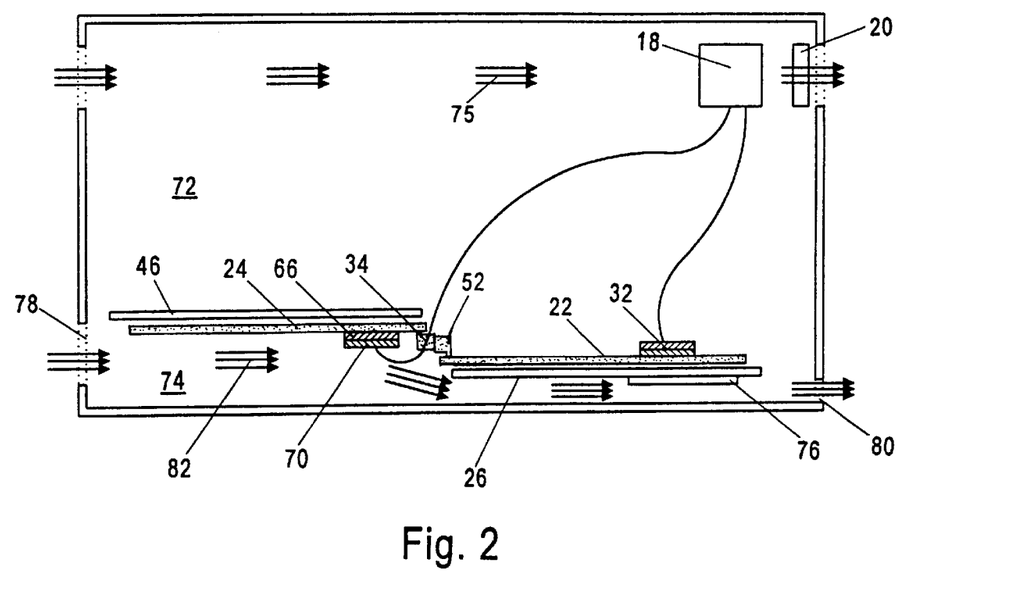
FIG. 2 is a top sectional view of a cross-platform computer assembly according to the invention.

Frame member 26 may have an angled section between boards 22 and 24 with openings therebetween for connectors 34 to pass through, and may continue to extend parallel to the portion backing I/O board 22 to the front of the housing, or the angled interconnect section may be eliminated as shown in FIG. 2 and a separate frame member 46 may be provided which is secured in the housing.

A pair of tracks 48 extend from frame member 26 or frame member 46 with logic board 24 being mounted in and slidable in tracks 48. As may be best seen in FIG. 4A, a pair of cams 50 are provided on board 24 which butt against tracks 48 when board 24 nears full insertion any may then be manually operated to interface with the front of housing 12 to cam board 24 to its final desired position. A pair of connectors 34A,34B are provided on board 24 which mate with corresponding connectors 52A,52B on board 22 when board 24 has been cammed into its final position, thereby electrically interconnecting the boards to permit selected address, data and control signals to pass therebetween, as discussed above.

With front panel 40 opened, the logic board 24 can be readily inserted and/or replaced. To remove the board 24, camming members 50 (FIG. 4A) are rotated to unlock the board from the rails 48, to disengage board 24 from I/O board 22, and to move the board 24 sufficiently out of the housing so that it may be easily grasped and slid along rails 48 for removal from the housing. The board 24 is inserted by the reverse process: the board is engaged in rails 48 and slid into position; cams 50 are then rotated to lock the board 24 into place and to fully engage connectors 34, 52.

Figure 5D:
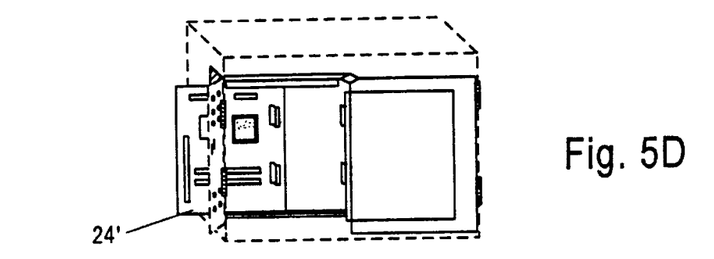
Figure 5E:
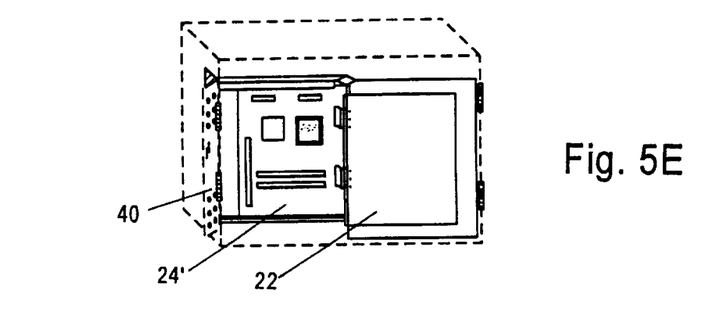

The removal and insertion of a logic board in an embodiment of the invention is illustrated in FIGS. 5A–5E. Particularly, in FIG. 5A, the front panel 40 is opened, thereby providing access to camming members 50. Once those camming members 50 have been rotated to the unlocked position, the logic board 24 is slid along rails 48 for removal; FIG. 5B. In FIG. 5C, the logic board 24 is complete removed from the housing 12. A replacement logic board 24' is then reinserted in housing 12 along rails 48; FIG. 5D. Referring to FIG. 5E, camming members 50 on replacement board 24' are rotated to lock the board 24' into place and into electrical connection with I/O board 22.

In one embodiment of the invention, side panel 36 is opened prior to removal of logic board 24 in order to permit detachment of power cable 70 (FIG. 2) to connector 66. Likewise, the side panel 35 is opened following insertion of replacement board 24' to permit reattachment of the power cable 70 and to permit setting of jumpers, dip switches, and the like, on board 24'.

In an alternate embodiment, the side panel 36 is not used during the removal and insertion of boards 24, 24'. Rather, power cable 70 is detached as board 24 is being removed through front panel 40; see FIGS. 5B, 5C. That cable is reattached to board 24 as that board is being reinserted; see FIGS. 5C, 5D. Jumpers, dip switches, and the like, on board 24' are likewise set as the board is being reinserted.

Likewise, in this alternate embodiment, the side panel 36 is not used for insertion/removal of components on the board 24, 24', e.g., for upgrades within a processor family or architecture. Rather, the board is slid partially out of the housing 12, as shown in FIG. 5B, to afford ready access to the components (e.g., CPU 56) being replaced.

An advantage of a computer 10 according to the invention is that computer dealers (e.g., resellers) can customize the computer at the time of sale to incorporate the architecture and components desired by the customer. For example, dealers may stock computers 10 without logic boards 24 and then quickly and easily insert a logic board appropriate for the computer family desired by a given customer. Further, the logic board 24 may be stocked by a dealer without processors 56 and/or memory boards 60 mounted therein and the appropriate processor chip and memory boards may be mounted in the board for the computer family selected by the customer at the time of sale. The dealer thus is afforded maximum flexibility in meeting customer requirements while being required to maintain minimum inventory of computers and of logic boards. Further, as system upgrades become available, the dealer can meet such system upgrades by merely ordering additional components, or at most additional logic boards, and without either the dealer or the manufacturer having their basic inventory obsoleted for long periods of time.

While it is desirable that the components of logic board 24 face outward, e.g., to facilitate access to components, sockets and connectors on the board via hinged side panel 36, this is not a limitation on the invention. In particular, as shown in FIG. 2, this configuration requires either that unkeyed connectors 34, 52 be utilized or that special connectors be utilized which are keyed so as to permit connection in the reverse direction as required for the preferred embodiment.

Figure 3:
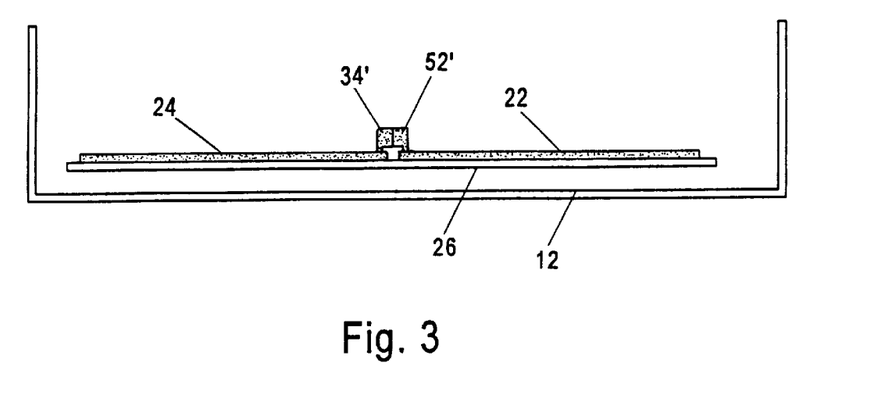
FIG. 3 is a partial top sectional view for an alternative embodiment of the invention shown in FIG. 2.

However, in some applications, it may be desirable to use standard connectors 34',52' (FIG. 3) and to mount boards 22,24 both facing in the same direction, which would normally be into housing 12 as shown in FIG. 3. Disconnects and connects for sockets/connectors 66,68 can be achieved by leads on the mating connectors which are sufficiently long so as to permit board 24 to be partially removed while these connections are still in place so as to permit access to these connectors for unplugging. Replacement of a processor chip 56 and/or memory board 60 can also be achieved by either partially or fully removing the logic board 24 and making the replacement. Unlike the prior art, major disassembly of the housing and of other components within the computer is not required in order for insertion or replacement of these components. The embodiment of FIG. 3 also permits the easy migration across different computer families, something which is not possible with any of the prior art architectures.

Further, while in FIG. 3 both boards are shown facing into housing 12, for example toward chamber 72, it is also within the contemplation of the invention for both boards 22, 24 to face toward the outside of the housing 12, i.e., toward nearest side 36. This affords the easy access to board 24 for disconnects from connectors 66,68 and for replacement of processor chips 56 and memory boards 60, and also permit certain upgrades to be made to the I/O board 22, if required.

While for the embodiments shown, logic board 24 is inserted and removed through the front of housing 12, and this is the currently preferred way of inserting the board, this is not a limitation on the invention and other modes for board insertion and removal are also possible in appropriate configurations. For example, with all or a part of side 36 open, it might be possible to insert a board into a suitable alignment element on frame member 46 or one some other suitable portions of the housing from the top, bottom, or side as appropriate, and then use cams 50 or other suitable positioning elements to move board 24 so as to permit mating of connectors 34 and 52. Alternatively, the connectors may be positioned so as to permit the connectors to mate with logic board 24 being brought in from a different direction. Instead of being hinged, side 36, or the portion thereof to be opened, may be snap-fitted, secured with a wing nut or otherwise secured in a way so as to be easily opened/removed and closed/replaced.

Heat Management

As indicated earlier, one major limitation on prior art computer expansion is heat management. The invention facilitates improved heat management by affording two heat flow paths: one for the components of logic board 24, and the other for the power supply 18 and the components on the I/O board 22.

Referring to FIG. 2, boards 22 and 24 effectively divide the inside of housing 12 into two chambers: a first or main chamber 72 between the boards 22, 24 and far side of housing 12; and a second chamber between the boards 22, 24 and near side 36 of housing 12. Heat is removed from chamber 72 in standard fashion by fan 20 with air inlet openings provided in the front and/or top of housing 10. Arrows 75 illustrate the air flow path for chamber 72, which path causes air to flow over the power supply and I/O controls 28 to remove heat therefrom, as well as removing heat from any other standard components positioned within housing chamber 72.

However, heat management is enhanced for the illustrated embodiment by also providing a high capacity low speed fan 76 mounted to frame member 26 and by providing openings 78 in portion 40 of the front of housing 12 and openings 80 in back of the housing in front of fan 76. Openings 78 and 80 are small enough so as not to adversely affect RF containment. Fan 76 draws air into chamber 74 and causes the air to flow across processor chip 56 and the various memory boards, this flow path being illustrated by arrows 82, thus facilitating the cooling of these components and permitting more powerful, and thus higher heat generating, components of these types to be utilized without danger of overheating and thus reduced component life.

Summary

Described above is an improved computer system meeting many varied and desirable objectives. While the invention has been particularly shown with respect to preferred embodiments, and various modifications to such embodiments have been discussed above, it should be appreciated that these embodiments are for purposes of illustration only and that the foregoing other changes in form and detail may be made in the various embodiments by one skilled in the art while still remaining within the spirit and scope of the invention.

Thus, by way of non-limiting example, although the illustrations depicts use of a "tower" housing 12, it will be appreciated that the improvements discussed herein are equally applicable to a so-called mini-towers and desktop housings.

By way of further non-limiting example, while a single processor chip 56 has been shown on logic board 24, and this is normally adequate for PC applications, where the computer is a server or other more powerful computer, the logic board may have two or more processors, and such logic boards are also within the contemplation of the invention. Memory modules or components other than boards may also be used in suitable applications and the processors and/or memory components may be mounted to the logic board in removable ways other than by sockets, or in applications where only computer families/logic boards are to be altered, by permanent attachment to the logic board.

By way of still further non-limiting example, while the logic board 24 is described above as being slidably received in rails of housing 12, it will be appreciated that other techniques that permit easy installation and removal of the logic board 24 without substantial disassembly of the housing 12 are also contemplated by the invention. Thus, for example, in alternate embodiments the logic board 24 can be pushed into, and pulled from, housing 12 without the use of sliding action. Moreover, in still other alternate embodiments, logic board 24 can be rotated into place in the housing 12.

By way of yet still further non-limiting example, although the discussion above indicates that the I/O board 22 contains platform-independent components, it will be appreciated that board 22 may also contain platform-dependent components. Likewise, though the discussion above indicates that the logic board 24 contains platform-dependent components, it will be appreciated that board 24 may also contain platform-dependent elements.

In view of the foregoing, what we claim is:

1. A motherboard set for a computer comprising:
    a removable logic board adapted for performing at least processor, processor control and processor memory functions, wherein the logic board is associated with a selected processor family,
    an input/output (I/O) board adapted for performing at least interface and control functions with selected inputs and outputs for the computer for a plurality of processor families with which logic boards are associated, and wherein said logic board and said I/O board mate directly with each other and, when mated, permit selected data and control signals to pass between the logic and I/O boards.

2. A motherboard set according to claim 1, wherein the logic board is adapted to be at least one of slidably installed and slidably removed from a housing of the computer.

3. A motherboard set according to claim 2, wherein the I/O board is adapted to be fixedly secured within the housing of the computer.

4. A motherboard set as claimed in claim 1 wherein said logic board and said I/O board, when connected by said connector components, face in opposite directions.

5. A motherboard set as claimed in claim 4, wherein the connector components are any of unkeyed and keyed to permit connection of the boards facing in opposite directions.

6. A motherboard set as claimed in claim 1, wherein said logic board has at least one socket for a processor and at least one socket for a memory board.

7. A motherboard set as claimed in claim 1 including a separate connection on each of said logic board and I/O board for applying electrical power to the board.

8. A motherboard set as claimed in claim 1 including at least one disk drive connection on said logic board.

9. A motherboard set as claimed in claim 1 further comprising connector components which are multi-pin connectors having selected pins grounded to maintain signal integrity for selected signal passing through the connector components.

10. A removable logic board for connection with an input/output (I/O) board that is platform-independent, which boards together serve as a motherboard of a computer, wherein the logic board is associated with a selected processor family, the logic board comprising:

a mounting for at least one processor;

a mounting for at least one memory component;

selected control circuitry for said at least one processor and said at least one memory component; and at least one connector component which is adapted to mate with corresponding at least one connector component on said I/O board to permit selected signals to pass between the boards.

11. A logic board according to claim 10, wherein the logic board is adapted to be at least one of slidably installed and slidably removed from a housing of the computer.

12. A logic board according to claim 10, wherein the logic board is adapted to be coupled with the I/O board that is fixedly secured within the housing of the computer.

13. A logic board according to claim 10, wherein the logic board is adapted for performing the processor, processor control and processor memory functions associated with a selected processor family.

14. A logic board as claimed in claim 10, wherein said logic board has at least one first socket for a processor and at least one second socket for a memory board.

15. A logic board as claimed in claim 14 including a connector on said logic board for applying electrical power thereto.

16. An assembly for a computer mounted in a housing, the assembly including:

a motherboard set comprised of a removable logic board adapted for performing at least processor, processor control and processor memory functions, wherein the logic board is associated with a selected processor family, an input/output (I/O) board adapted for performing at least interface and control functions with selected inputs and outputs for the computer for a plurality of processor families with which logic boards are associated, and wherein said logic board and said I/O board mate directly with each other and, when mated, permit selected data and control signals to pass between the logic and I/O boards;

a mounting for fixedly securing the I/O board relative to said housing; and a mounting for said logic board which facilitates easy insertion of said logic board into said housing, removal of said logic board from said housing, and mating of connector components on said logic and I/O boards when the logic board is inserted in the housing.

17. An assembly according to claim 16, wherein the mounting for the logic board is adapted to permit the logic board to be at least one of slidably installed and slidably removed from the housing of the computer.

18. An assembly according to claim 16, wherein the logic board is adapted for performing the processor, processor control and processor memory functions associated with a selected processor family, and wherein the I/O board is adapted to perform the interface and control functions with selected inputs and outputs for the computer for a plurality of processor families with which logic boards are associated.

19. An assembly as claimed in claim 16, wherein said logic board and said I/O board face in opposite directions, said logic board facing a near wall of the housing and said I/O board facing into the housing.

20. An assembly as claimed in claim 16, including a first chamber in said housing defined by said boards on one side and a far wall of the housing on the other side, and a second larger chamber defined by said boards on one side and a near wall of said housing on the other side, and a separate heat removal mechanism for each of the chambers.

21. An assembly as claimed in claim 20, wherein the heat removal mechanism for said second chamber includes a fan mounted within that chamber for cooling thereof.

22. An assembly as claimed in claim 16, including separate heat removal mechanisms for said logic board and for said I/O board.

23. An assembly as claimed in claim 16, including a separate connection on each of said logic board and I/O board for applying electrical power to the board.

* * * * *